United States Patent [19]

Crandall

[11] Patent Number: 5,581,616

[45] Date of Patent: Dec. 3, 1996

[54] METHOD AND APPARATUS FOR DIGITAL SIGNATURE AUTHENTICATION

[75] Inventor: Richard E. Crandall, Redwood City, Calif.

[73] Assignee: NeXT Software, Inc., Redwood City, Calif.

[21] Appl. No.: 484,264

[22] Filed: Jun. 7, 1995

Related U.S. Application Data

[63] Continuation of Ser. No. 167,408, Dec. 14, 1993, Pat. No. 5,463,690, which is a continuation of Ser. No. 955,479, Oct. 2, 1992, Pat. No. 5,271,061, which is a continuation of Ser. No. 761,276, Sep. 17, 1991, Pat. No. 5,159,632.

[51] Int. Cl.[6] .................................................. H04L 9/30
[52] U.S. Cl. ............................................. 380/28; 380/30
[58] Field of Search .................................. 380/25, 28, 30

[56] References Cited

U.S. PATENT DOCUMENTS

| | | | |
|---|---|---|---|
| 5,146,500 | 9/1992 | Maurer | 380/28 |
| 5,159,632 | 10/1992 | Crandall | 380/28 |
| 5,218,637 | 1/1993 | Angebaud et al. | 380/25 |
| 5,271,061 | 12/1993 | Crandall | 380/28 |
| 5,272,755 | 12/1993 | Miyaji et al. | 380/30 |
| 5,463,690 | 10/1995 | Crandall | 380/30 |
| 5,521,980 | 12/1996 | Brands | 380/28 |

*Primary Examiner*—Salvatore Cangialosi
*Attorney, Agent, or Firm*—Hecker & Harriman

[57] ABSTRACT

The present invention improves speed and reduces complexity in a digital signature scheme that uses elliptic algebra. The signature scheme generates two points that are compared. If the points do not match, the signature is not authentic. The present invention reduces computations by comparing only the x coordinates of the two generated points. The invention provides a scheme for deducing the possible values of the x-coordinate of a sum of two points using only the x coordinates of the original two points in question. The present invention provides a scheme that limits the possible solutions that satisfy the equation to two (the authentic signature and one other). Because of the large number of possible inauthentic solutions, the chance of a false authentic signature is statistically insignificant.

1 Claim, 7 Drawing Sheets

METHOD AND APPARATUS FOR DIGITAL SIGNATURE AUTHENTICATION

This is a continuation in part of U.S. patent application Ser. No. 08/167,408 filed Dec. 14, 1993 (now issued as U.S. Pat. No. 5,463,690) which is a continuation of U.S. patent application Ser. No. 07/955,479 filed Oct. 2, 1992 (now issued as U.S. Pat. No. 5,271,061) which is a continuation of U.S. application Ser. No. 07/761,276 filed Sep. 17, 1991 (now issued as U.S. Pat. No. 5,159,632).

BACKGROUND OF THE PRESENT INVENTION

1. Field of the Invention

This invention relates to the field of cryptographic systems.

2. Background Art

A cryptographic system is a system for sending a message from a sender to a receiver over a medium so that the message is "secure", that is, so that only the intended receiver can recover the message. A cryptographic system converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy, (or may be created by a local user to ensure privacy).

A block diagram of a typical public key cryptographic system is illustrated in FIG. 1. A sender represented by the blocks within dashed line 100 sends a plaintext message Ptxt to a receiver, represented by the blocks within dashed line 115. The plaintext message is encrypted into a ciphertext message C, transmitted over some transmission medium and decoded by the receiver 115 to recreate the plaintext message Ptxt.

The sender 100 includes a cryptographic device 101, a secure key generator 102 and a key source 103. The key source 103 is connected to the secure key generator 102 through line 104. The secure key generator 102 is coupled to the cryptographic device 101 through line 105. The cryptographic device provides a ciphertext output C on line 106. The secure key generator 102 provides a key output on line 107. This output is provided, along with the ciphertext message 106, to transmitter receiver 109. The transmitter receiver 109 may be, for example, a computer transmitting device such as a modem or it may be a device for transmitting radio frequency transmission signals. The transmitter receiver 109 outputs the secure key and the ciphertext message on an insecure channel 110 to the receiver's transmitter receiver 111.

The receiver 115 also includes a cryptographic device 116, a secure key generator 117 and a key source 118. The key source 118 is coupled to the secure key generator 117 on line 119. The secure key generator 117 is coupled to the cryptographic device 116 on line 120. The cryptographic device 116 is coupled to the transmitter receiver 111 through line 121. The secure key generator 117 is coupled to the transmitter receiver 111 on lines 122 and 123.

In operation, the sender 100 has a plaintext message Ptxt to send to the receiver 115. Both the sender 100 and the receiver 115 have cryptographic devices 101 and 116, respectively, that use the same encryption scheme. There are a number of suitable cryptosystems that can be implemented in the cryptographic devices. For example, they may implement the Data Encryption Standard (DES) or some other suitable encryption scheme.

Sender and receiver also have secure key generators 102 and 117, respectively. These secure key generators implement any one of several well known public key exchange schemes. These schemes, which will be described in detail below, include the Diffie-Hellman scheme, the RSA scheme, the Massey-Omura scheme, and the ElGamal scheme.

The sender 100 uses key source 103, which may be a random number generator, to generate a private key. The private key is provided to the secure key generator 102 and is used to generate an encryption key $e_K$. The encryption key $e_K$ is transmitted on lines 105 to the cryptographic device and is used to encrypt the plaintext message Ptxt to generate a ciphertext message C provided on line 106 to the transmitter receiver 109. The secure key generator 102 also transmits the information used to convert to the secure key from key source 103 to the encryption key $e_K$. This information can be transmitted over an insecure channel, because it is impractical to recreate the encryption key from this information without knowing the private key.

The receiver 115 uses key source 118 to generate a private and secure key 119. This private key 119 is used in the secure key generator 117 along with the key generating information provided by the sender 100 to generate a deciphering key $D_K$. This deciphering key $D_K$ is provided on line 120 to the cryptographic device 116 where it is used to decrypt the ciphertext message and reproduce the original plaintext message.

The Diffie-Hellman Scheme

A scheme for public key exchange is presented in Diffie and Hellman, "New Directions in Cryptography," IEEE Trans. Inform. Theory, vol. IT-22, pp. 644–654, November 1976 (The "DH" scheme). The DH scheme describes a public key system based on the discrete exponential and logarithmic functions. If "q" is a prime number and "a" is a primitive element, then X and Y are in a 1:1 correspondence for $1 \leq X, Y \leq (q-1)$ where $Y = a^X \mod q$, and $X = \log_a Y$ over the finite field. The first discrete exponential function is easily evaluated for a given a and X, and is used to compute the public key Y. The security of the Diffie-Hellman system relies on the fact that no general, fast algorithms are known for solving the discrete logarithm function $X=\log_a Y$ given X and Y.

In a Diffie-Hellman system, a directory of public keys is published or otherwise made available to the public. A given public key is dependent on its associated private key, known only to a user. However, it is not feasible to determine the private key from the public key. For example, a sender has a public key, referred to as "ourPub". A receiver has a public key, referred to here as "theirPub". The sender also has a private key, referred to here as "myPri". Similarly, the receiver has a private key, referred to here as "theirPri".

There are a number of elements that are publicly known in a public key system. In the case of the Diffie-Hellman system, these elements include a prime number p and a primitive element g. p and g are both publicly known. Public keys are then generated by raising g to the private key power (mod p). For example, a sender's public key myPub is generated by the following equation:

$$\text{myPub}=g^{myPri} \pmod{p} \qquad \text{Equation (1)}$$

Similarly, the receiver's public key is generated by the equation:

$$\text{theirPub}=g^{theirPri} \pmod{p} \qquad \text{Equation (2)}$$

Public keys are easily created using exponentiation and modulo arithmetic. As noted previously, public keys are easily obtainable by the public. They are published and distributed. They may also be transmitted over non-secure channels. Even though the public keys are known, it is very difficult to calculate the private keys by the inverse function because of the difficulty in solving the discrete log problem.

FIG. 2 illustrates a flow chart that is an example of a key exchange using a Diffie-Hellman type system. At step 201, a prime number p is chosen. This prime number p is public. Next, at step 202, a primitive root g is chosen. This number g is also publicly known. At step 203 an enciphering key $e_K$ is generated, the receiver's public key (theirPub) is raised to the power of the sender's private key (myPri). That is:

$$(\text{theirPub})^{myPri} \pmod{p} \qquad \text{Equation (3)}$$

We have already defined theirPub equal to $g^{theirPri}$ (mod p). Therefore Equation 3 can be given by:

$$(g^{theirPri})^{myPri} \pmod{p} \qquad \text{Equation (4)}$$

This value is the enciphering key $e_K$ that is used to encipher the plaintext message and create a ciphertext message. The particular method for enciphering or encrypting the message may be any one of several well known methods. Whichever encrypting message is used, the cipher key is the value calculated in Equation 4. The ciphertext message is then sent to the receiver at step 204.

At step 205, the receiver generates a deciphering key $D_K$ by raising the public key of the sender (myPri) to the private key of the receiver (theirPri) as follows:

$$D_K=(\text{myPub})^{theirPri} \pmod{p} \qquad \text{Equation (5)}$$

From Equation 1, myPub is equal to $g^{myPri}$ (mod p). Therefore:

$$D_K=(g^{myPri})^{theirPri} \pmod{p} \qquad \text{Equation (6)}$$

Since $(g^A)^B$ is equal to $(g^B)^A$, the encipher key $e_K$ and the deciphering key $D_K$ are the same key. These keys are referred to as a "one-time pad." A one-time pad is a key used in enciphering and deciphering a message.

The receiver simply executes the inverse of the transformation algorithm or encryption scheme using the deciphering key to recover the plaintext message at step 206. Because both the sender and receiver must use their private keys for generating the enciphering key, no other users are able to read or decipher the ciphertext message. Note that step 205 can be performed prior to or contemporaneously with any of steps 201–204.

RSA

Another public key cryptosystem is proposed in Rivest, Shamir and Adelman, "On Digital Signatures and Public Key Cryptosystems," Commun. Ass. Comput. Mach., vol. 21, pp. 120–126, February 1978 (The "RSA" scheme). The RSA scheme is based on the fact that it is easy to generate two very large prime numbers and multiply them together, but it is much more difficult to factor the result, that is, to determine the very large prime numbers from their product. The product can therefore be made public as part of the enciphering key without compromising the prime numbers that effectively constitute the deciphering key.

In the RSA scheme a key generation algorithm is used to select two large prime numbers p and q and multiply them to obtain n=pq. The numbers p and q can be hundreds of decimal digits in length. Then Euler's function is computed as $\phi(n)=(p-1)(q-1)$. ($\phi(n)$ is the number of integers between 1 and n that have no common factor with n). $\phi(n)$ has the property that for any integer a between 0 and n−1 and any integer k, $a^{k\phi(n)+1}=a \pmod{n}$.

A random number E is then chosen between 1 and $\phi(n)-1$ and which has no common factors with $\phi(n)$. The random number E is the enciphering key and is public. This then allows $D=E^{-1} \bmod \phi(n)$ to be calculated easily using an extended version of Euclid's algorithm for computing the greatest common divisor of two numbers. D is the deciphering key and is kept secret.

The information (E, n) is made public as the enciphering key and is used to transform unenciphered, plaintext messages into ciphertext messages as follows: a message is first represented as a sequence of integers each between 0 and n−1. Let P denote such an integer. Then the corresponding ciphertext integer is given by the relation $C=P^E \bmod n$. The information (D, n) is used as the deciphering key to recover the plaintext from the ciphertext via $P=C^D \bmod n$. These are inverse transformations because $C^D=P^{ED}=P^{k\phi(n)+1}=P$.

MASSEY-OMURA

The Massey-Omura cryptosystem is described in U.S. Pat. No. 4,567,600. In the Massey cryptosystem, a finite field $F_q$ is selected. The field $F_q$ is fixed and is a publicly known field. A sender and a receiver each select a random integer e between 0 and q−1 so that the greatest common denominator G. C. D. (e, q−1)=1. The user then computes its inverse $D=e^{-1} \bmod q-1$ using the euclidian algorithm. Therefore, De=1 mod q−1.

The Massey-Omura cryptosystem requires that three messages be sent to achieve a secure transmission. Sender A sends message P to receiver B. Sender A calculates random number $e_A$ and receiver B calculates random number $e_B$. The sender first sends the receiver the element $P^{e_A}$. The receiver is unable to recover P since the receiver does not know $e_A$. Instead, the receiver raises the element to his own private key $e_B$ and sends a second message $P^{e_A e_B}$ back to the sender. The sender then removes the effect of $e_A$ by raising the element to the $D_{A-th}$ power and returns $P^{e_B}$ to the receiver B. The receiver B can read this message by raising the element to the $D_{B-th}$ power.

ELGAMAL CRYPTOSYSTEM

The ElGamal public key cryptosystem utilizes a publicly known finite field $F_q$ and an element g of $F^*_q$. Each user randomly chooses an integer a=to $a_A$ in the range 0>a>q-1. The integer a is the private deciphering key. The public enciphering key is the element $g^a$ $F_q$. To send a message represented by P to a user A, an integer K is randomly chosen. A pair of elements of $F_q$, namely ($g^K$, $pg^{aK}$) are sent to A. The plaintext message Ptxt is encrypted with the key $g^{aK}$. The value $g^K$ is a "clue" to the receiver for determining the plaintext message Ptxt. However, this clue can only be used by someone who knows the secure deciphering key "a". The receiver A, who knows "a", recovers the message P from this pair by raising the first element $gK^{ath}$ and dividing the result into the second element.

ELLIPTIC CURVES

Another form of public key cryptosystem is referred to as an "elliptic curve" cryptosystem. An elliptic curve cryptosystem is based on points on an elliptic curve E defined over a finite field F. Elliptic curve cryptosystems rely for security on the difficulty in solving the discrete logarithm problem. An advantage of an elliptic curve cryptosystem is there is more flexibility in choosing an elliptic curve than in choosing a finite field. Nevertheless, elliptic curve cryptosystems have not been widely used in computer-based public key exchange systems due to their computational intensiveness. Computer-based elliptic curve cryptosystems are slow compared to other computer public key exchange systems. Elliptic curve cryptosystems are described in "A Course in Number Theory and Cryptography" (Koblitz, 1987, Springer-Verlag, New York).

AUTHENTICATION

In addition to protecting the contents of a transmitted message, it is also desired to provide a way to determine the "authenticity" of the message. That is, is the message actually from the purported sender. A scheme for accomplishing this is to append a so-called "digital signature" to the message. One such scheme is described in Koblitz, supra. The enciphering transformation $f_A$ is used to send a message to user A and $f_B$ is the enciphering transformation used to send a message to user B. User A provides a "signature" P that may include some specific information, such as the time the message was sent or an identification number. User A transmits the signature as $f_B f_A^{-1}$ (P). When user B deciphers the message using $f_B^{-1}$, the entire message is decoded into plaintext except the signature portion, which remains $f_A^{-1}$ (P). User B then applies user A's public key $f_A$ to obtain P. Since P could only have been encrypted by user A (because only user A knows $f_A^{-1}$) user B can assume that the message was sent by user A.

Another scheme of digital signature authentication is a generalization of the ElGamal discrete logarithm scheme, using elliptic algebra. Assume a public key ourPub generated with a function of a private key ourPri. The signature is generated by first choosing a random integer m of approximately q bits. Next a point $P=m°(X_1/1)$ is computed. A message digest function M is used to compute an integer u that is a function of m, ourPri, and the digested version of the ciphertext message and the computed point P. The computed pair (u, P) is transmitted as the signature.

At the receiving end, the u value of the signature is used to compute the point $Q=u°(X_1/1)$. A point R is calculated using P, the digested version of the ciphertext message and P, and myPub. If R and Q do not compare exactly, the signature is not valid (not genuine). The security of this scheme relies on the computational infeasability of breaking the elliptic logarithm operation or the hash function M. A disadvantage of this scheme is that it is computationally intensive, making it complex and slow in operation.

SUMMARY OF THE INVENTION

The present invention improves speed and reduces complexity in a digital signature scheme that uses elliptic algebra. The signature scheme generates two points that are compared. If the points do not match, the signature is not authentic. The present invention reduces computations by comparing only the x coordinates of the two generated points. The invention provides a scheme for deducing the possible values of the x-coordinate of a sum of two points using only the x coordinates of the original two points in question. The present invention provides a scheme that limits the possible solutions that satisfy the equation to two (the authentic signature and one other). Because of the large number of possible inauthentic solutions, the chance of a false authentic signature is statistically insignificant.

DETAILED DESCRIPTION OF THE INVENTION

Figure 1:
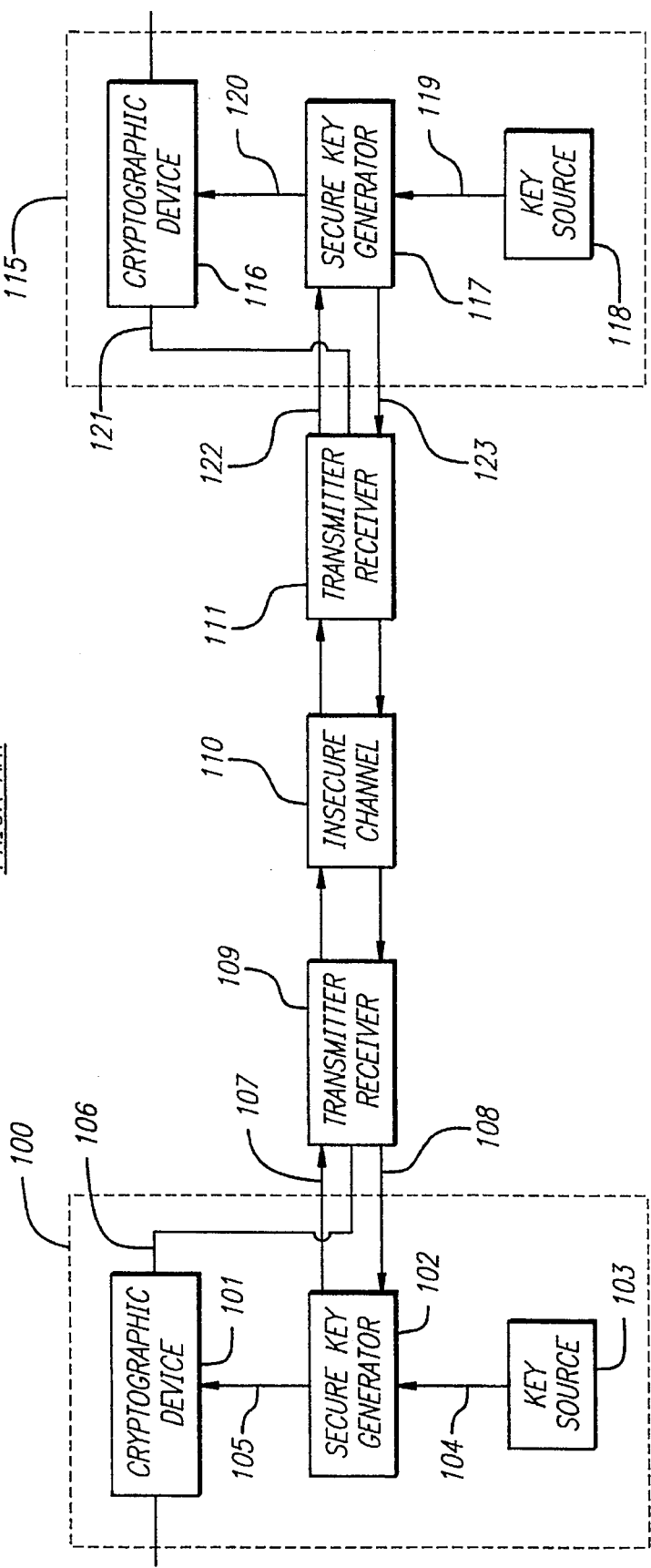
FIG. 1 is a block diagram of a prior art public key exchange system.
Figure 2:
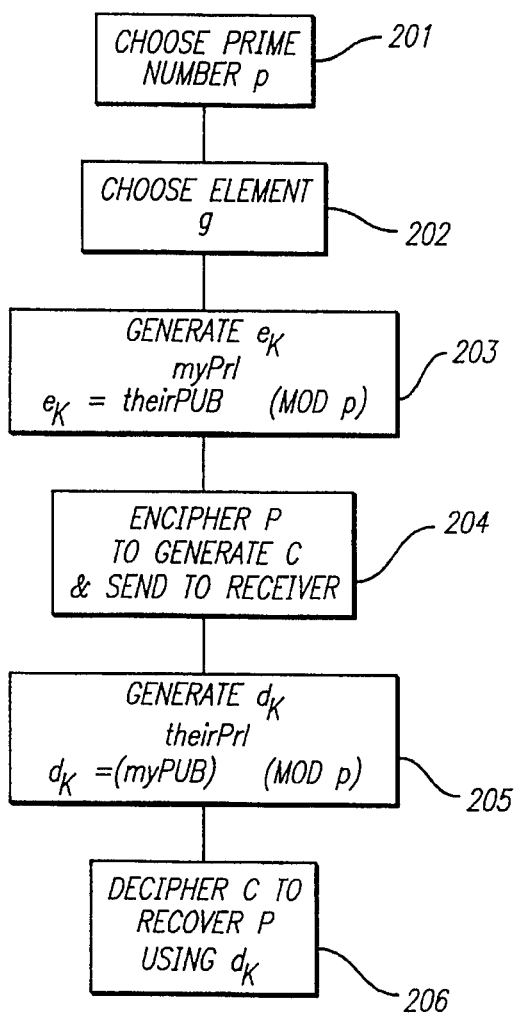
FIG. 2 is a flow diagram of a prior art public key exchange transaction.

An elliptic curve encryption scheme is described. In the following description, numerous specific details, such as number of bits, execution time, etc., are set forth in detail to provide a more thorough description of the present invention. It will be apparent, however, to one skilled in the art, that the present invention may be practiced without these specific details. In other instances, well known features have not been described in detail so as not to obscure the present invention.

A disadvantage of prior art computer-implemented elliptic curve encryption schemes is they are unsatisfactorily slow compared to other prior art computer-implemented encryption schemes. The modulo arithmetic and elliptical algebra operations required in a prior art elliptic curve cryptosystem require that divisions be performed. Divisions increase computer CPU (central processing unit) computational overhead. CPU's can perform addition and multiplication operations more quickly, and in fewer processing steps, than division operations. Therefore, prior art elliptic curve cryptosystems have not been previously practical or desirable as compared to other prior art cryptosystems, such as Diffie-Hellman and RSA schemes.

The present invention provides methods and apparatus for implementing an elliptic curve cryptosystem for public key exchange that does not require explicit division operations. The advantages of the preferred embodiment of the present invention are achieved by implementing fast classes of numbers, inversionless parameterization, and FFT multiply mod operations.

Elliptic Curve Algebra

The elliptic curve used with the present invention is comprised of points $(x,y) \in F_{p^k} \times F_{p^k}$ satisfying:

$$b\ y^2 = x^3 + a\ x^2 + x \qquad \text{Equation (7)}$$

together with a "point at infinity" a.

Sender ("our") and recipient ("their") private keys are assumed to be integers, denoted:

ourPri, theirPri $\in Z$ Next, parameters are established for both sender and recipient. The parameters are: (mod p)

q, so that $p=2^q-C$ is a fast class number (q is the "bit-depth"). The value q is a publicly known value.

k, so that $F_{p^k}$ will be the field, and where k is publicly known.

$(x_1, y_1) \in F_{p^k}$, the initial x-coordinate, which is publicly known.

$a \in F_{p^k}$, the curve-defining parameter (b is not needed). The value a is also publicly known.

The present invention uses an operation referred to as "elliptic multiplication" and represented by the symbol "∘". The operation of elliptic multiplication can be described as follows:

An initial point $(X_1, Y_1)$ on the curve of Equation 7 is defined. For the set of integers n, expression $n°(X_1, Y_1)$ denotes the point $(X_n, Y_n)$ obtained via the following relations, known as adding and doubling rules.

$$X_{n+1} = ((Y_n - Y_1)/(X_n - X_1))^2 - X_1 - X_n \qquad \text{Equation (8)}$$

$$Y_{n+1} = -Y_1 + ((Y_n - Y_1)/(X_n - X_1))(X_1 - X_{n+1}) \qquad \text{Equation (9)}$$

When $(X_1, Y_1) = (X_n, Y_n)$, the doubling relations to be used are:

$$X_{n+1} = ((3X_1^2 + a)/2Y_1)^2 - 2X_1; \qquad \text{Equation (10)}$$

$$Y_{n+1} = -Y_1 + ((3X_1^2 + a)/2Y_1)(X_1 - X_{n+1}) \qquad \text{Equation (11)}$$

Because arithmetic is performed over the field $F_{p^k}$, all operations are to be performed (mod p). In particular, the division operation in equations 8 to 11 involve inversions (mod p).

Elliptic Curve Public Key Exchange

It is necessary that both sender and recipient use the same set of such parameters. Both sender and recipient generate a mutual one-time pad, as a particular x-coordinate on the elliptic curve.

Figure 3:
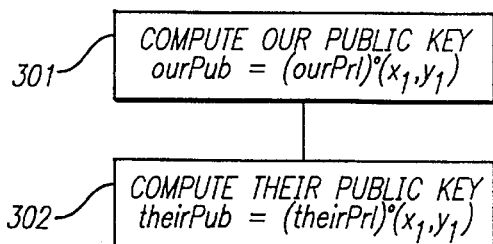
FIG. 3 is a flow diagram illustrating the key exchange of the present invention.
Figure 3:
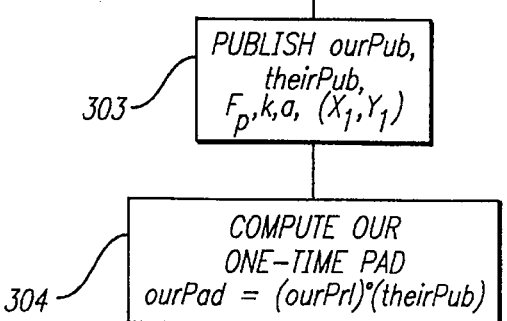
Figure 3:
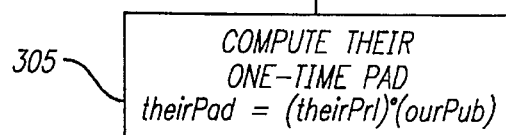
Figure 3:
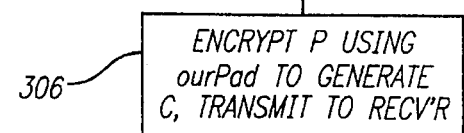
Figure 3:

In the following description, the terms "our" and "our end" refer to the sender. The terms "their" and "their end" refer to the receiver. This convention is used because the key exchange of the present invention may be accomplished between one or more senders and one or more receivers. Thus, "our" and "our end" and "their" and "their end" refers to one or more senders and receivers, respectively. The public key exchange of the elliptic curve cryptosystem of the present invention is illustrated in the flow diagram of FIG. 3.

Step 301

At our end, a public key is computed: ourPub $\in F_{p^k}$ $$\text{ourPub} = (\text{ourPri})°(x_1, y_1) \qquad \text{Equation (12)}$$

Step 302

At their end, a public key is computed: theirPub $\in F_{p^k}$ $$\text{theirPub} = (\text{theirPri})°(x_1, y_1) \qquad \text{Equation (13)}$$

Step 303

The two public keys ourPub and theirPub are published, and therefore known to all users.

Step 304

A one-time pad is computed at our end: ourPad $\in F_{p^k}$ $$\text{ourPad} = (\text{ourPri})°(\text{theirPub}) = (\text{ourPri})°(\text{theirPri})°(x_1, y_1) \qquad \text{Equation (14)}$$

Step 305

A one-time pad is computed at their end: theirPad $\in F_{p^k}$ $$\text{theirPad} = (\text{theirPri})°(\text{ourPub}) = (\text{theirPri})°(\text{ourPri})°(x_1, y_1) \qquad \text{Equation (15)}$$

The elements $(\text{theirPri})°(\text{ourPri})°(x_1, y_1)$ being part of a finite field, form an abelian group. Therefore, the order of operation of equations 14 and 15 can be changed without affecting the result of the equations. Therefore:

$$\text{ourPad} = (\text{ourPri})°(\text{theirPri})°(x_1, y_1) = (\text{theirPri})°(\text{ourPri})°(x_1, y_1) = \text{theirPad} \qquad \text{Equation (16)}$$

Since both the sender and receiver use the same one time pad, the message encrypted by the sender can be decrypted by the recipient, using the one time pad. (Note that step 305 can be executed prior to or contemporaneously with any of steps 301–304).

At step 306, the sender encrypts plaintext message Ptxt using ourPad, and transmits ciphertext message C to the receiver. At step 307, the receiver decrypts ciphertext message C to recover plaintext message Ptxt, using theirPad.

Fast Class Numbers

Elliptic curve cryptosystems make use of modulo arithmetic to determine certain parameters, such as public keys, one time pads, etc. The use of modulo arithmetic serves the dual purpose of limiting the number of bits in the results of equations to some fixed number, and providing security. The discrete log problem is asymmetrical in part because of the use of modulo arithmetic. A disadvantage of modulo arithmetic is the need to perform division operations. The solution to a modulo operation is the remainder when a number is divided by a fixed number. For example, 12 mod 5 is equal to 2. (5 divides into 12 twice with a remainder of 2, the remainder 2 is the solution). Therefore, modulo arithmetic requires division operations.

Special fast classes of numbers are used in the present invention to optimize the modulo arithmetic required in the enciphering and deciphering process by eliminating the need for division operations. The class of numbers used in the present invention is generally described by the form $2^q - C$ where C is an odd number and is relatively small, (e.g. no longer than the length of a computer word.

When a number is of this form, modulo arithmetic can be accomplished using shifts and adds only, eliminating the need for divisions. One subset of this fast class is known as "Mersenne" primes, and are of the form $2^q - 1$. Another class that can be used with the present invention are known as "Fermat" numbers of the form $2^q+1$, where q is equal to $2^m$. Fermat numbers may be prime or not prime in the present invention.

The present invention utilizes elliptic curve algebra over a finite field $F_{p^k}$ where $p=2^q-C$ and p is a fast class number. Note that the equation $2^q-C$ does not result in a prime number for all values of q. and C For example, when q is equal to 4, and C is equal to 1, $2^q-C$ is equal to 15, not a prime. However, when q has a value of 2, 3, or 5, and C=1 the equation $2^q-C$ generates the prime numbers 3, 7, and 31.

The present invention implements elliptic curves over a finite field $F_{p^k}$ where p is $2^q-C$ is an element of a fast class of numbers. When practiced on a computer using binary representations of data, the use of fast class numbers allows the (mod p) operations to be accomplished using only shifts and adds. By contrast, the use of "slow" numbers requires that time consuming division operations be executed to perform (mod p) arithmetic. The following examples illustrate the advantage of fast class number (mod p) arithmetic.

EXAMPLE 1 base 10 (mod p) division

Consider the 32 bit digital number n, where n=11101011110001110011010l (In base 10 this number is 3,991,652,149).

Now consider n (mod p) where p is equal to 127. The expression n mod 127 can be calculated by division as follows:

```
            31430331
      127 / 3991652149
            381
            ---
            181
            127
            ---
            546
            508
            ---
            385
            381
            ---
             42
              0
            ---
            421
            381
            ---
            404
            381
            ---
            239
            127
            ---
            112
```

The remainder 112 is the solution to n mod 127.

EXAMPLE 2

Mersenne Prime (mod p) Arithmetic

In the present invention, when p is a Mersenne prime where $p=2^q-1$, the (mod p) arithmetic can be accomplished using only shifts and adds, with no division required. Consider again n (mod p) where n is 3,991,652,149 and p is 127. When p is 127, q is equal to 7, from $p=2^q-1$; $127=2^7-1=128-1=127$.

Figure 5:
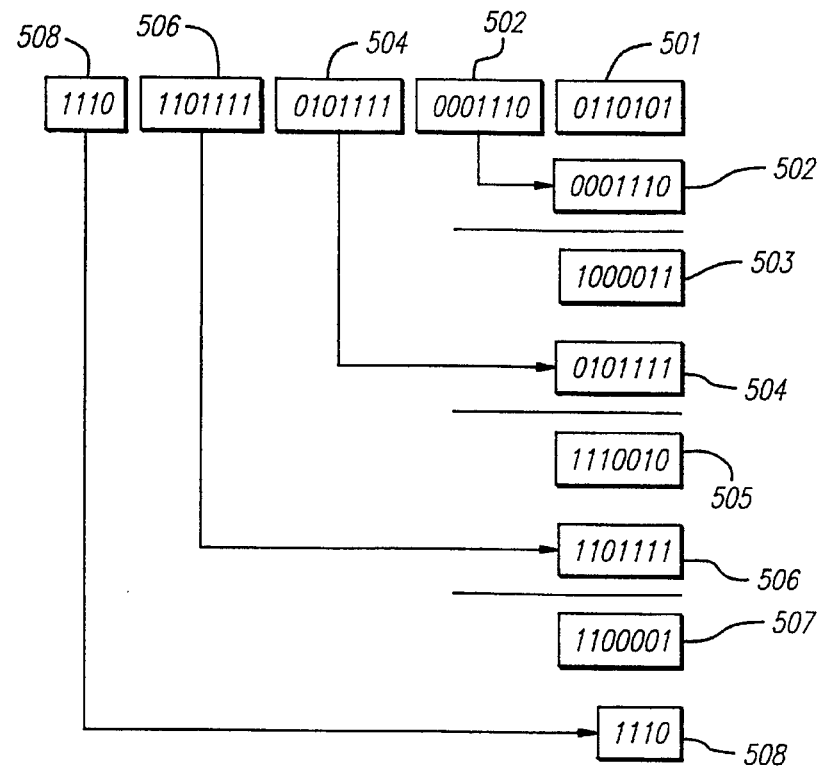
FIG. 5 is a diagram illustrating the shift and add operations for performing mod p arithmetic using Mersenne primes.
Figure 5:
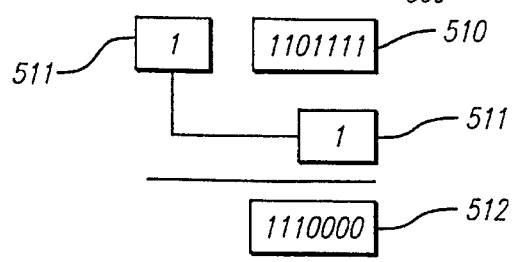

The (mod p) arithmetic can be accomplished by using the binary form of n, namely 11101011110101111000111001101011. Referring to FIG. 5, the shifts and adds are accomplished by first latching the q least significant bits (LSB's) 501 of n, namely 0110101. The q LSB's 502 of the remaining digits, namely 0001110, are then added to q digits 501, resulting in sum 503 (1000011). The next q LSB's 504 of n, (0101111), are added to sum 503, generating sum 505, (1110010). Bits 506 of n (1101111) are added to sum 505, to result in sum 507, (11100001).

The remaining bits 508 (1110), even though fewer in number than q bits, are added to sum 507 to generate sum 509 (11101111). This sum has greater than q bits. Therefore, the first q bits 510 (1101111) are summed with the next q bits 511 (in this case, the single bit 1), to generate sum 512 (1110000). This sum, having q or fewer bits, is the solution to n (mod p). $1110000=2^6+2^5+2^4=64+32+16=112$.

Thus, the solution 112 to n mod 127 is determined using only shifts and adds when an elliptic curve over a field of Mersenne primes is used. The use of Mersenne primes in conjunction with elliptic curve cryptosystems eliminates explicit divisions.

EXAMPLE 3

Fermat Number (mod p) Arithmetic

In the present invention, when p is a Fermat number where $p=2^q+1$, the (mod p) arithmetic can be accomplished using only shifts, adds, and subtracts (a negative add), with no division required. Consider again n (mod p) where n is 3,991,652,149 and where p is now 257. When p is 257, q is equal to 8, from $p=2^q+1$; $257=2^8+1=256+1=257$.

Figure 6:
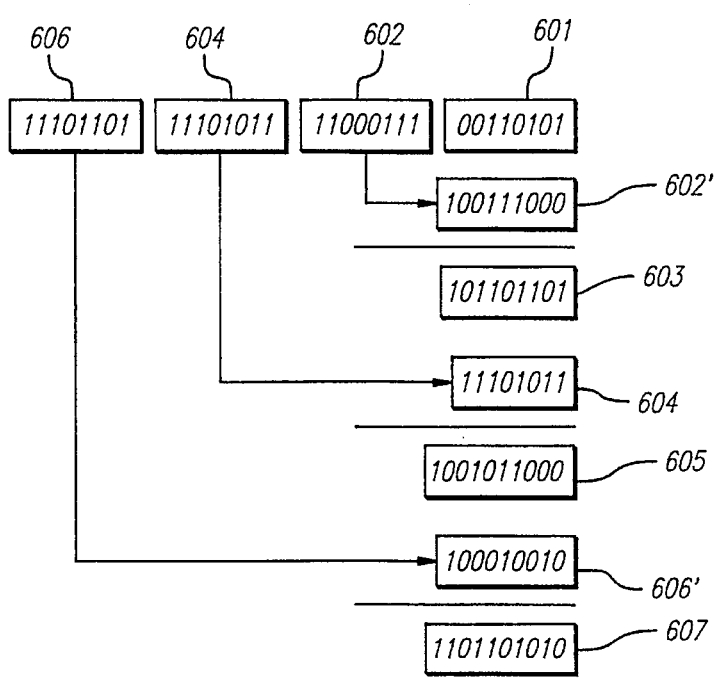
FIG. 6 is a diagram illustrating the operations for performing mod p arithmetic using Fermat numbers.

The (mod p) arithmetic can be accomplished by using the binary form of n, namely 11101011110101111000111001101011. Referring to FIG. 6, the shifts and adds are accomplished by first latching the q (8) least significant bits (LSB's) 601 (00110101). The next q LSB's 602 of the remaining digits, namely 11000111, are to be subtracted from q digits 601. To accomplish this, the 1's complement of bits 602 is generated and a 1 is added to the MSB side to indicate a negative number, resulting in bits 602' (100111000). This negative number 602' is added to bits 601 to generate result 603 (101101101). The next q LSB's 604 of n, (11101011), are added to sum 603, generating result 605, (1001011000). Bits 606 of n (11101101) are to be subtracted from result 605. Therefore, the 1's complement of bits 606 is generated and a negative sign bit of one is added on the MSB side to generate bits 606' (100010010). Bits 606' is added to result 605, to generate sum 607, (1101101010).

Sum 607 has more than q bits so the q LSB's are latched as bits 608 (01101010). The next q bits (in this case, only two bits, 11) are added to bits 608, generating sum 610 (01101101). This sum, having q or fewer bits, is the solution to n (mod p). $01101101=2^6+2^5+2^3+2^2+2^0=64+32+8+4+1=109$.

EXAMPLE 4

Fast Class mod arithmetic

In the present invention, when p is a number of the class $p=2^q-C$, where C is and odd number and is relatively small, (e.g. no greater than the length of a digital word), the (mod p) arithmetic can be accomplished using only shifts and adds, with no division required. Consider again n (mod p) where n is 685 and where p is 13. When p is 13, q is equal to 4 and C is equal to 3, from $p=2^q-C$; $13=2^4-3=16-3=13$.

Figure 7:
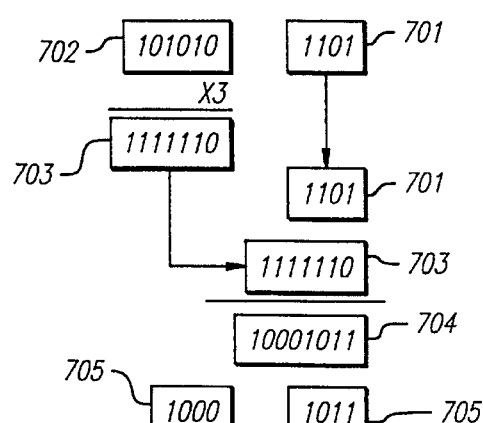
FIG. 7 is a diagram illustrating the operations for performing mod p arithmetic using fast class numbers.
Figure 7:
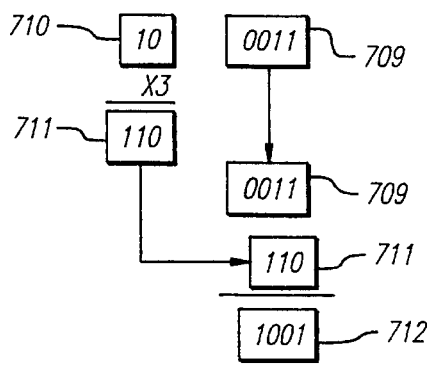

The (mod p) arithmetic can be accomplished by using the binary form of n, namely 1010101101. Referring to FIG. 7, the shifts and adds are accomplished by first latching the q (4) least significant bits (LSB's) 701 of n, namely 1101. The remaining bits 702 (101010) are multiplied by C (3) to generate product 703 (1111110). Product 703 is added to bits 701 to generate sum 704 (10001011). The q least significant bits 705 (1011) of sum 704 are latched. The remaining bits 706 (1000) are multiplied by C to generate product 707 (11000). Product 707 is added to bits 705 to generate sum 708 (100011). The q least significant bits 709 (0011) of sum 708 are latched. The remaining bits 710 (10) are multiplied by C to generate product 711 (110). Product 711 is added to bits 709 to generate sum 712 (1001). Sum 712, having q or fewer bits, is the solution to n (mod p). $1001=2^3+2^0=8+1=9$. 685 divided by 13 results in a remainder of 9. The fast class arithmetic provides the solution using only shifts, adds, and multiplies.

Shift and Add Implementation

Fast Mersenne mod operations can be effected via a well known shift procedure. For $p=2^q-1$ we can use:

$$x=(x\&p)+(x>>q) \quad \text{Equation (17)}$$

a few times in order to reduce a positive x to the appropriate residue value in the interval 0 through p−1 inclusive. This procedure involves shifts and add operations only. Alternatively, we can represent any number x (mod p) by:

$$x=a+b2(q+1)/2=(a, b) \quad \text{Equation (18)}$$

If another integer y be represented as (c, d), we have:

$$xy \pmod{p} = (ac+2bd, ad+bc) \quad \text{Equation (19)}$$

after which some trivial shift-add operations may be required to produce the correct reduced residue of xy.

To compute an inverse (mod p), there are at least two ways to proceed. One is to use a binary form of the classical extended-GCD procedure. Another is to use a relational reduction scheme. The relational scheme works as follows:

Given $p=2^q-1$, $x\neq 0 \pmod p$, to return $x^{-1} \pmod p$:
1) Set (a, b)=(1, 0) and (y, z)=(x, p);
2) If (y==0) return(z);
3) Find e such that $2^e//y$;
4) Set $a=2^{q-e}a \pmod p$;
5) If(y==1) return(a);
6) Set (a, b)=(a+b, a−b) and (y, z)=(y+z, y−z);
7) Go to (2).

The binary extended-GCD procedure can be performed without explicit division via the operation $[a/b]_2$, defined as the greatest power of 2 not exceeding a/b:

Given p, and $x\neq 0 \pmod p$, to return $x^{-1} \pmod p$:
1) If (x==1) return(1);
2) Set (x, v0)=(0, 1) and $(u_1, v_1)=(p, x)$;
3) Set $u_0=[u_1/v_1]2$;
4) Set (x, v0)=$(v_0, x-u_0v_0)$ and $(u_1, v_1)=(v_1, u_1-u_0v_1)$;
5) If $(v_1==0)$ return(x); else go to (3).

Figure 4:
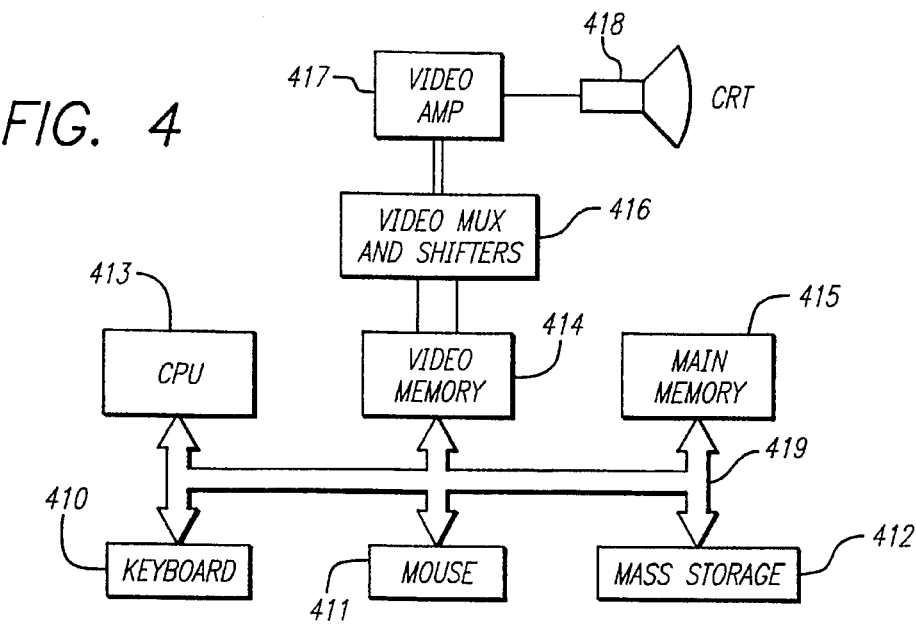
FIG. 4 is a block diagram of a computer system on which the present invention may be implemented.

The present invention may be implemented on any conventional or general purpose computer system. An example of one embodiment of a computer system for implementing this invention is illustrated in FIG. 4. A keyboard 410 and mouse 411 are coupled to a bi-directional system bus 419. The keyboard and mouse are for introducing user input to the computer system and communicating that user input to CPU 413. The computer system of FIG. 4 also includes a video memory 414, main memory 415 and mass storage 412, all coupled to bi-directional system bus 419 along with keyboard 410, mouse 411 and CPU 413. The mass storage 412 may include both fixed and removable media, such as magnetic, optical or magnetic optical storage systems or any other available mass storage technology. The mass storage may be shared on a network, or it may be dedicated mass storage. Bus 419 may contain, for example, 32 address lines for addressing video memory 414 or main memory 415. The system bus 419 also includes, for example, a 32-bit data bus for transferring data between and among the components, such as CPU 413, main memory 415, video memory 414 and mass storage 412. Alternatively, multiplex data/address lines may be used instead of separate data and address lines.

In the preferred embodiment of this invention, the CPU 413 is a 32-bit microprocessor manufactured by Motorola, such as the 68030 or 68040. However, any other suitable microprocessor or microcomputer may be utilized. The Motorola microprocessor and its instruction set, bus structure and control lines are described in MC68030 User's Manual, and MC68040 User's Manual, published by Motorola Inc. of Phoenix, Ariz.

Main memory 415 is comprised of dynamic random access memory (DRAM) and in the preferred embodiment of this invention, comprises 8 megabytes of memory. More or less memory may be used without departing from the scope of this invention. Video memory 414 is a dual-ported video random access memory, and this invention consists, for example, of 256 kbytes of memory. However, more or less video memory may be provided as well.

One port of the video memory 414 is coupled to video multiplexer and shifter 416, which in turn is coupled to video amplifier 417. The video amplifier 417 is used to drive the cathode ray tube (CRT) raster monitor 418. Video multiplexing shifter circuitry 416 and video amplifier 417 are well known in the art and may be implemented by any suitable means. This circuitry converts pixel data stored in video memory 414 to a raster signal suitable for use by monitor 418. Monitor 418 is a type of monitor suitable for displaying graphic images, and in the preferred embodiment of this invention, has a resolution of approximately 1020× 832. Other resolution monitors may be utilized in this invention.

The computer system described above is for purposes of example only. The present invention may be implemented in any type of computer system or programming or processing environment.

Block Diagram

Figure 8:
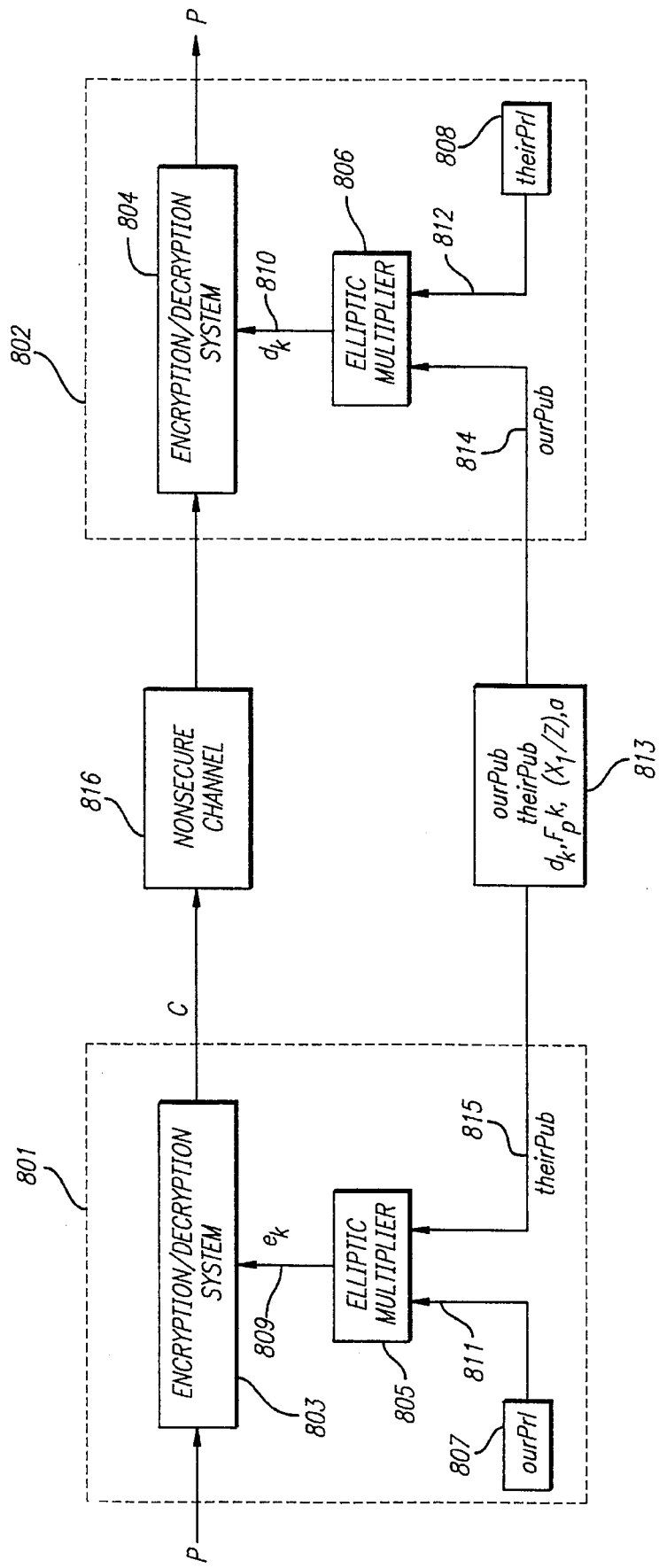
FIG. 8 is a block diagram of the present invention.

FIG. 8 is a block diagram of the present invention. A sender, represented by the components within dashed line 801, encrypts a plaintext message Ptxt to a ciphertext message C. This message C is sent to a receiver, represented by the components within dashed line 802. The receiver 802 decrypts the ciphertext message C to recover the plaintext message Ptxt.

The sender 801 comprises an encryption/decryption means 803, an elliptic multiplier 805, and a private key source 807. The encryption/decryption means 803 is coupled to the elliptic multiplier 805 through line 809. The elliptic multiplier 805 is coupled to the private key source 807 through line 811.

The encryption/decryption means 804 of receiver 802 is coupled to elliptic multiplier 806 through line 810. The elliptic multiplier 806 is coupled to the private key source 808 through line 812.

The private key source 807 of the sender 801 contains the secure private password of the sender, "ourPri". Private key source 807 may be a storage register in a computer system, a password supplied by the sender to the cryptosystem when a message is sent, or even a coded, physical key that is read by the cryptosystem of FIG. 8 when a message is sent or received. Similarly, the private key source 808 of receiver 802 contains the secure private password of the receiver, namely, "theirPri".

A separate source 813 stores publicly known information, such as the public keys "ourPub" and "theirPub" of sender 801 and receiver 802, the initial point $(x_1, y_1)$, the field $F_{pk}$, and curve parameter "a". This source of information may be a published directory, an on-line source for use by computer systems, or it may transmitted between sender and receiver over a non-secure transmission medium. The public source 813 is shown symbolically connected to sender 801 through line 815 and to receiver 802 through line 814.

In operation, the sender and receiver generate a common one time pad for use as an enciphering and deciphering key in a secure transmission. The private key of the sender, ourPri, is provided to the elliptic multiplier 805, along with the sender's public key, theirPub. The elliptic multiplier 805 computes an enciphering key $e_K$ from (ourPri)°(theirPub) (mod p). The enciphering key is provided to the encryption/decryption means 803, along with the plaintext message Ptxt. The enciphering key is used with an encrypting scheme, such as the DES scheme or the elliptic curve scheme of the present invention, to generate a ciphertext message C. The ciphertext message is transmitted to the receiver 802 over a nonsecure channel 816.

The receiver 802 generates a deciphering key $D_K$ using the receiver's private key, theirPri. TheirPri is provided from the private key source 808 to the elliptic multiplier 804, along with sender's public key, ourPub, (from the public source 813). Deciphering key $D_K$ is generated from (theirPri)°(ourPub) (mod p). The deciphering key $D_K$ is equal to the enciphering key $e_K$ due to the abelian nature of the elliptic multiplication function. Therefore, the receiver 802 reverses the encryption scheme, using the deciphering key $D_K$, to recover the plaintext message Ptxt from the ciphertext message C.

The encryption/decryption means and elliptic multiplier of the sender 801 and receiver 802 can be implemented as program steps to be executed on a microprocessor.

Inversionless Parameterization

The use of fast class numbers eliminates division operations in (mod p) arithmetic operations. However, as illustrated by equations 13–16 above, the elliptic multiply operation "°" requires a number of division operations to be performed. The present invention reduces the number of divisions required for elliptic multiply operations by selecting the initial parameterization to be inversionless. This is accomplished by selecting the initial point so that the "Y" terms are not needed.

In the present invention, both sender and recipient generate a mutual one-time pad, as a particular x-coordinate on the elliptic curve. By choosing the initial point $(X_1, Y_1)$ appropriately, divisions in the process of establishing multiples n°$(X_1, Y_1)$ are eliminated. In the steps that follow, the form $$n°(X_m/Z_m) \quad \text{Equation (20)}$$

for integers n, denotes the coordinate $(X_{n+m}/Z_{n+m})$. For $x=X/Z$ the x-coordinate of the multiple n(x, y) as $X_n/Z_n$, is calculated using a "binary ladder" method in accordance with the adding-doubling rules, which involve multiply mod operations:

If $i \neq j$:

$$X_{i+j}=Z_{i-j}(X_iX_j-Z_iZ_j)^2 \quad \text{Equation (21)}$$

$$Z_{i+j}=X_{i-j}(X_iZ_j-Z_iX_j)^2 \quad \text{Equation (22)}$$

Otherwise, if $i=j$:

$$X_{2i}=(X_i^2-Z_i^2)^2 \quad \text{Equation (23)}$$

$$Z_{2i}=4X_iZ_i(X_i^2+a\,X_iZ_i+Z_i^2) \quad \text{Equation (24)}$$

These equations do not require divisions, simplifying the calculations when the present invention is implemented in the present preferred embodiment. This is referred to as "Montgomery parameterization" or "inversionless parameterization" (due to the absence of division operations), and is described in "*Speeding the Pollard and Elliptic Curve Methods of Factorization*" Montgomery, P. 1987 Math. Comp., 48 (243–264). When the field is simply $F_p$ this scheme enables us to compute multiples nx via multiplication, addition, and (rapid) Mersenne mod operations. This also holds when the field is $F_p2$. Because p=3 (mod 4) for any Mersenne prime p, we may represent any $X_i$ or $Z_i$ as a complex integer, proceeding with complex arithmetic for which both real and imaginary post-multiply components can be reduced rapidly (mod p). We also choose $Z_1=1$, so that the initial point on the curve is $(X_1/1, y)$ where y will not be needed.

Using both fast class numbers and inversionless parameterization, a public key exchange using the method of the present invention can proceed as follows. In the following example, the prime is a Mersenne prime. However, any of the fast class numbers described herein may be substituted.

1) At "our" end, use parameter a, to compute a public key:
   ourPub $\in F_{pk}$
   (X/Z)=ourPri°$(X_1/1)$
   ourPub=$XZ^{-1}$ 2) At "their" end, use parameter a, to compute a public key: theirPub $\in F_{pk}$
   (X/Z)=theirPri°$(X_1/1)$
   theirPub=$XZ^{-1}$ 3) The two public keys ourPub and theirPub are published, and therefore are known.

4) Compute a one-time pad: ourPad $\in F_{pk}$
   (X/Z)=ourPri°(theirPub/1)
   ourPad=$XZ^{-1}$ 5) Compute a one-time pad: theirPad $\in F_{pk}$
   (X/Z)=theirPri°(ourPub/1)
   theirPad=$XZ^{-1}$ The usual key exchange has been completed, with
ourPad=theirPad Message encryption/decryption between "our" end and "their" end may proceed according to this mutual pad.

FFT Multiply

For very large exponents, such as q>5000, it is advantageous to perform multiplication by taking Fourier transforms of streams of digits. FFT multiply works accurately, for example on a 68040-based NeXTstation, for general operations xy (mod p) where $p=2^q-1$ has no more than $q=2^{20}$ (about one million) bits. Furthermore, for Mersenne p there are further savings when one observes that order-q cyclic convolution of binary bits is equivalent to multiplication (mod $2^q-1$). The use of FFT multiply techniques results in the ability to perform multiply-mod in a time roughly proportional to q log q, rather than $q^2$.

Elliptic curve algebra can be sped up intrinsically with FFT techniques. Let X denote generally the Fourier transform of the digits of X, this transform being the same one used in FFT multiplication. Then we can compute coordinates from equations 21–24. To compute $X_{i+j}$ for example, we can use five appropriate transforms, ($X_i$, $X_j$, $Z_i$, $Z_j$, and $Z_{i-j}$) (some of which can have been stored previously) to create the transform:

$$X_{i+j}=Z_{i-j}(X_iX_j-Z_iZ_j)^2$$

In this way the answer $X_{i+j}$ can be obtained via 7 FFT's. (Note that the usual practice of using 2 FFT's for squaring and 3 FFT's for multiplication results in 11 FFT's for the "standard" FFT approach). The ratio 7/11 indicates a significant savings for the intrinsic method. In certain cases, such as when p is a Mersenne prime and one also has an errorless number-theoretic transform available, one can save spectra from the past and stay in spectral space for the duration of long calculations; in this way reducing times even further.

Figure 9:
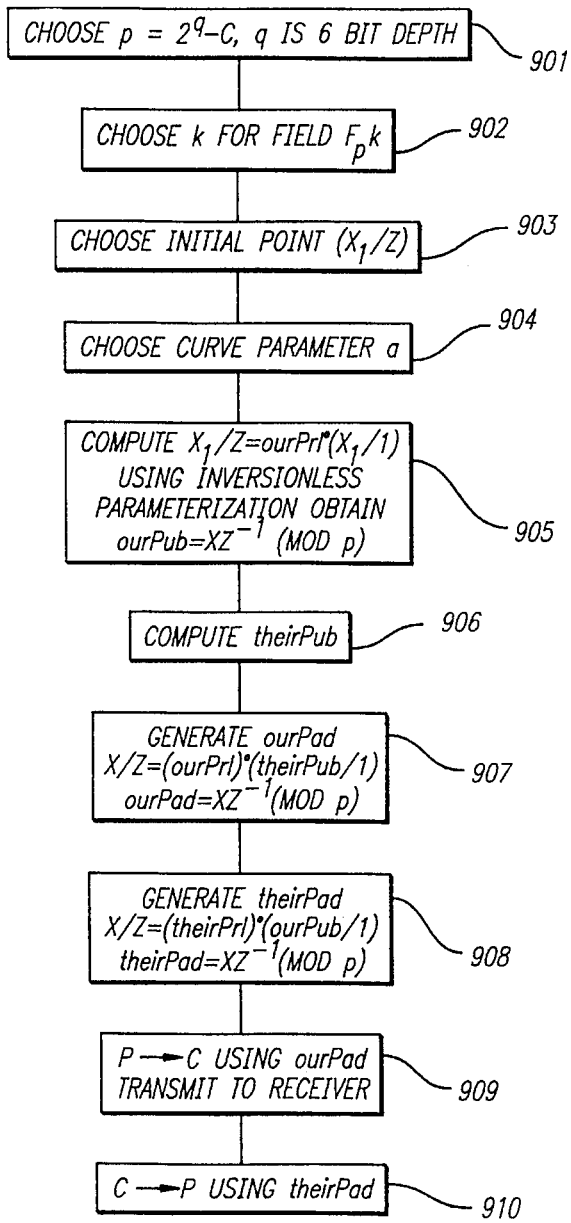
FIG. 9 is a flow diagram illustrating the operation of one embodiment of the present invention.

A flow diagram illustrating the operation of the present invention when using fast class numbers, inversionless parameterization and FFT multiply operations is illustrated in FIG. 9. At step 901, a fast class number p is chosen where $p=2^q-C$. The term q is the bit depth of the encryption scheme. The greater the number of bits, the greater the security. For large values of q, FFT multiply operations are used to calculate p. The term p is made publicly available.

At step 902, the element k for the field $F_{pk}$ is chosen and made public. At step 903, an initial point $(X_1/Z)$ on the elliptic curve is selected. By selecting the initial point to be inversionless, costly divides are avoided. The initial point is made public. The curve parameter a is chosen at step 904 and made public.

At step 905, the sender computes $X_1/Z=\text{ourPri}°(X_1/1)$ using inversionless parameterization. The sender's public key is generated ourPub=$(XZ^{-1})$(mod p). The receiver's public key theirPub=$(XZ^{-1})$(mod p), is generated at step 906.

A one time pad for the sender, ourPad, is generated at step 907. X/Z=(ourPri)°(theirPub/1). ourPad=$XZ^{-1}$(mod p). At step 908, a one time pad for the receiver, theirPad, is generated. X/Z=(theirPri)°(ourPub/1). theirPad=$XZ^{-1}$(mod p). The calculation of ourPad and theirPad utilizes FFT multiplies to eliminate the need to calculate the inversion $Z^{-1}$. At step 909, the sender converts a plaintext message Ptxt to a ciphertext message C using ourPad. The ciphertext message C is transmitted to the receiver. At step 910, the receiver recovers the plaintext message Ptxt by deciphering the ciphertext message C using theirPad.

FEE Security

The algebraic factor $M_{89}=2^{89}-1$, which is a Mersenne prime, occurs with "natural" statistics when the elliptic curve method (ECM) was employed. This was shown in attempts to complete the factorization of $M_{445}=2^{445}-1$ (this entry in the Cunningham Table remains unresolved as of this writing). In other words, for random parameters a the occurrence $k(X_1/1)=O$ for elliptic curves over $F_p$ with $p=M_{89}$ was statistically consistent with the asymptotic estimate that the time to find the factor $M_{89}$ of $M_{445}$ be O(exp($\sqrt{(2 \log p \log \log p)}$)). These observations in turn suggested that finding the group order over $F_p$ is not "accidentally" easier for Mersenne primes p, given the assumption of random a parameters.

Secondly, to check that the discrete logarithm problem attendant to FEE is not accidentally trivial, it can be verified, for particular a parameters, that for some bounded set of integers N $$(p^N-1)(X_1/1) \neq O$$

The inequality avoids the trivial reduction of the discrete logarithm evaluation to the equivalent evaluation over a corresponding finite field. Failures of the inequality are extremely rare, in fact no non-trivial instances are known at this time for q>89.

The present invention provides a number of advantages over prior art schemes, particularly factoring schemes such as the RSA scheme. The present invention can provide the same security with fewer bits, increasing speed of operation. Alternatively, for the same number of bits, the system of the present invention provides greater security.

Another advantage of the present cryptosystem over prior art cryptosystems is the distribution of private keys. In prior art schemes such as RSA, large prime numbers must be generated to create private keys. The present invention does not require that the private key be a prime number. Therefore, users can generate their own private keys, so long as a public key is generated and published using correct and publicly available parameters p, $F_{pk}$, $(X_1/Z)$ and "a". A user cannot generate its own private key in the RSA system.

DIGITAL SIGNATURE

The present invention provides an improved method for creating and authenticating a digital signature that uses the elliptic algebra described above and a hashing or digesting function. The sender has prepared an encrypted message "ciphertext". This message may be encrypted as described above or may be encrypted using any other encryption scheme. The sender then creates a digital signature to append to the message as a way of "signing" the message. The signature scheme of the preferred embodiment is described below, followed by the method of reducing computations.

Creation of Signature

Assume a curve parameterized by a, with starting point $(X_1/1)$. The sender's public key ourPub is generated as the multiple ourPri°$(x_1/1)$, where ourPri is our private key (an integer) and ° is multiplication on the elliptic curve. The digital signature is created as follows:

1) Choose a random integer m of approximately q bits.
2) Compute the point $$P=m°(X_1/1).$$

3) Using a message digest function M, compute the integer $$u=m+\text{our Pri}*M(\text{ciphertext, }P)$$

where ciphertext is the encrypted message to be sent.

4) Along with the ciphertext, transmit the digital signature as the pair (u, P). Note that u is an integer of about $2^q$ bits, while P is a point on the curve.

In the preferred embodiment of the present invention, a message digesting function M such as MD2 or MD5 is used as part of the creation of the digital signature. However, the present invention may be implemented using other digesting functions or by using any suitable hashing function.

Authentication of Digital Signature

The receiver attempts to authenticate the signature by generating a pair of points to match the digital signature pair, using the ciphertext message and the public key of the purported sender. The receiver verifies the signature using the following steps:

1) Using the u part of the signature, compute the point $$Q=u°(X_1/1)$$

2) Compare the point Q to the point $$R=P+M(\text{ciphertext, }P)°\text{ourPub}$$

The signature is invalid if these elliptic points Q and R do not compare exactly. In other words, if the signature is authentic, the following must hold:

$$u°(X_1/1)=P+M(\text{ciphertext, }P)°\text{ourPub}$$

Substituting for u on the left side of the equation above gives:

$(m+\text{our Pri}*M(\text{ciphertext}, P))°(X_1/1)=P+M(\text{ciphertext}, P)°\text{ourPub}$ or:

$m°(X_1/1)+(\text{ourPri}*M(\text{ciphertext}, P))°(X_1/1)=P+M(\text{ciphertext}, P)°\text{ourPub}$ Substituting for ourPub on the right side of the equation yields:

$m°(X_1/1)+(\text{ourPri}*M(\text{ciphertext}, P))°(X_1/1)=P+M(\text{ciphertext}, P)°\text{ourPri}°(X_1/1)$ Since $P=m°(X_1/1)$ from above, the left side becomes:

$P+(\text{ourPri}*M(\text{ciphertext}, P))°(X_1/1)=P+M(\text{ciphertext}, P)°\text{ourPri}°(X_1/1)$ Moving ourPri in the right side of the equation gives:

$P+\text{ourPri}*M(\text{ciphertext}, P))°(X_1/1)=P+\text{ourPri}*M(\text{ciphertext}, P)°(X_1/1)$ Thus, a point on a curve is calculated via two different equations using the transmitted pair (u, P). It can be seen that by calculating Q from the transmitted point u, and by calculating R from transmitted point P, the ciphertext message, and the public key of the purported sender, the digital signature is assumed authenticated when Q and R match.

Security

The digital signature scheme of this scheme is secure on the basis of the following observation. To forge a signature one would need to find a pair (u, P) and a ciphertext that satisfy the equation $u°(X_1/1)=P+M(\text{ciphertext}, P)°\text{ourPub}$ This would either entail an elliptic logarithm operation (the basis of the encryption security of the present invention) or breaking of the hash function M.

Optimizing Authentication

The recipient's final step in the digital signature scheme of the present invention involves the addition of two points; namely P and M(ciphertext, P)° ourPub to yield R and comparing that sum to a point Q. One could perform the elliptic addition using specified y-coordinates at each step. The scheme of the present invention provides a method of deducing the possible values of the x-coordinate of a sum of two points, using only the respective x-coordinates of the original two points in question. Using this method one may rapidly perform a necessity check on whether the points Q and the sum of P+M(ciphertext, P)°ourPub have identical x-coordinates.

A principle for fast verification of sums, using only x-coordinates, runs as follows. Let the curve be $By^2=x^3+Ax^2+x$ Theorem: Let $P_1=(x_1, y_1)$, $P_2=((x_2, y_2)$, and $Q=(x, y)$ be three points on a given curve, with $x_1 \neq x_2$, Then $P_1+P_2=Q$ only if $x(c-x)=b^2$ where $b=(x_1 x_2-1)/(x_1-x_2)$ $C=2\{(x_1 x_2+1)(x_1+x_2+2A)-[2A]/(x_1-x_2)^2$ The proof is given as follows. Not knowing the y-coordinates of $P_1$ and $P_2$, the only possibilities for the x-coordinate of the sum $P_1+P_2$ are, for any fixed pair $(y_1, t_2)$, the respective x-coordinates (call them e,f)) of the two forms $(x_1,y_1)+(x_2, y_2)$. One can compute:

$ef=b^2$ $e+f=c$ as in Montgomery, supra. Since x is one or the other of e,f it is necessary that $(x-e)(x-f)=0$, whence the quadratic equation of the theorem holds.

Therefore, the quadratic equation $(x-e)(x-f)=0$ will generally have two solutions. One solution corresponds to an authentic signature. The other solution is extremely unlikely to have been selected at random, because the pool of x coordinates is of a size comparable to the elliptic curve. Therefore, when $(x-e)(x-f)=0$ is satisfied, it can be safely assumed that the signature is authentic.

In practical application, $P_1$ represents the calculated point P that is sent as part of the signature by the sender. $P_2$ represents the expression M(ciphertext, P)°ourPub. Q of course represents $u°(X_1/1)$. $P_1+P_2$ represents R and is compared to Q.

Flow Diagrams

Figure 10:
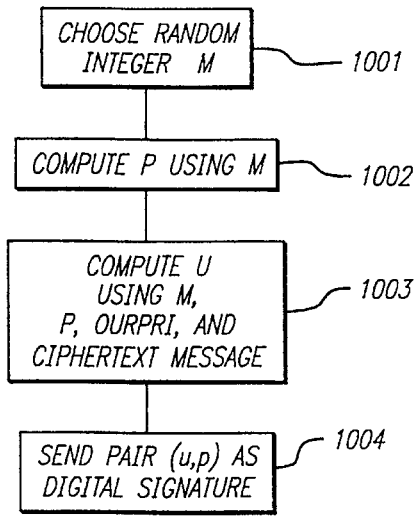
FIG. 10 is a flow diagram illustrating the generation of a digital signature using the present invention.

FIG. 10 is a flow diagram illustrating the generation of a digital signature using the present invention. At step 1001, the sender chooses a random integer m. This random integer can be generated using a suitable random number generator for use with a microprocessor. At step 1002 a point P is calculated using m. As noted above, this point is generated using the relation $P=m°(X_1/1)$. in the preferred embodiment of the present invention. However, other schemes may be used for generating point P without departing from the scope of the present invention.

At step 1003, a second point, u, is calculated using m, P, ourPri, and the ciphertext message. In the preferred embodiment of the invention, this is generated using the relationship u=m+our Pri * M(ciphertext, P). As noted above, hashing functions other than digesting functions MD2 and MD5 can be used. In addition, other relationships can be used to calculate u. It is recommended that if other relationships are used, that m, P, ourPri and the ciphertext message be used. At step 1004, the calculated pair (u, P) is sent as a digital signature.

Figure 11:
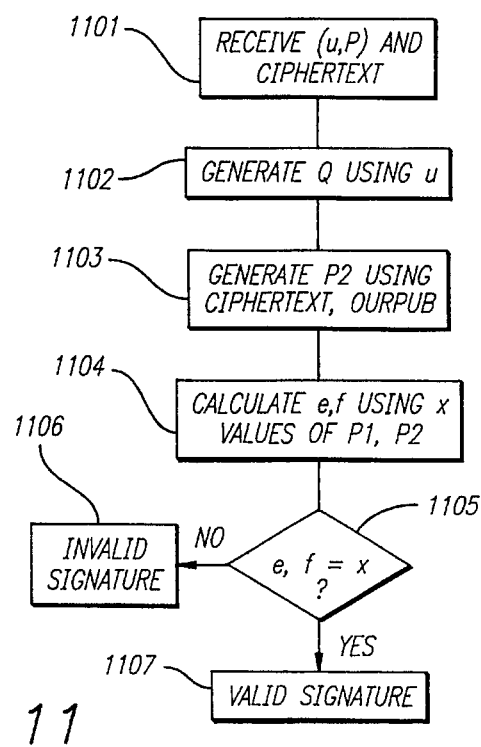
FIG. 11 is a flow diagram illustrating the authentication of a digital signature in the present invention.

FIG. 11 is a flow diagram illustrating the authentication of a digital signature in the present invention. At step 1101 the recipient of the message recieves the digital signature (u, P) and the ciphertext message. At step 1102 the point Q is generated using the point u. In the preferred embodiment, the relationship $Q=u°(X_1/1)$ is used to generate Q. Other relationships may be used depending on what relationships were used to calculate u, P by the sender.

At step 1103 a point $P_2$ is generated using ourPub and the ciphertext message. In the preferred embodiment, the relationship M(ciphertext, P)°ourPub is used to generate $P_2$. Other relationships may be used depending on what relationships were used to calculate u, P by the sender.

At step 1104 the x values of $P_1$ and $P_2$ are used to determine values b and c and ultimately, e and f. This leads to to possible x values for the sum of $P_1$ and $P_2$. At decision block 1105 the argument "e,f=x?" is made to determine if either of the possible x values satisfies the equality of $P_1+P_2=Q$. If neither of the calculated x values satisfy the equation, that is, if the argument at decision block 1105 is false, the signature is not authentic and is indicated at block 1106. If one of the x values does satisfy the equation, that is, if the argument at decision block 1105 is true, a valid signature is assumed and indicated at block 1107.

Block Diagram

Figure 12:
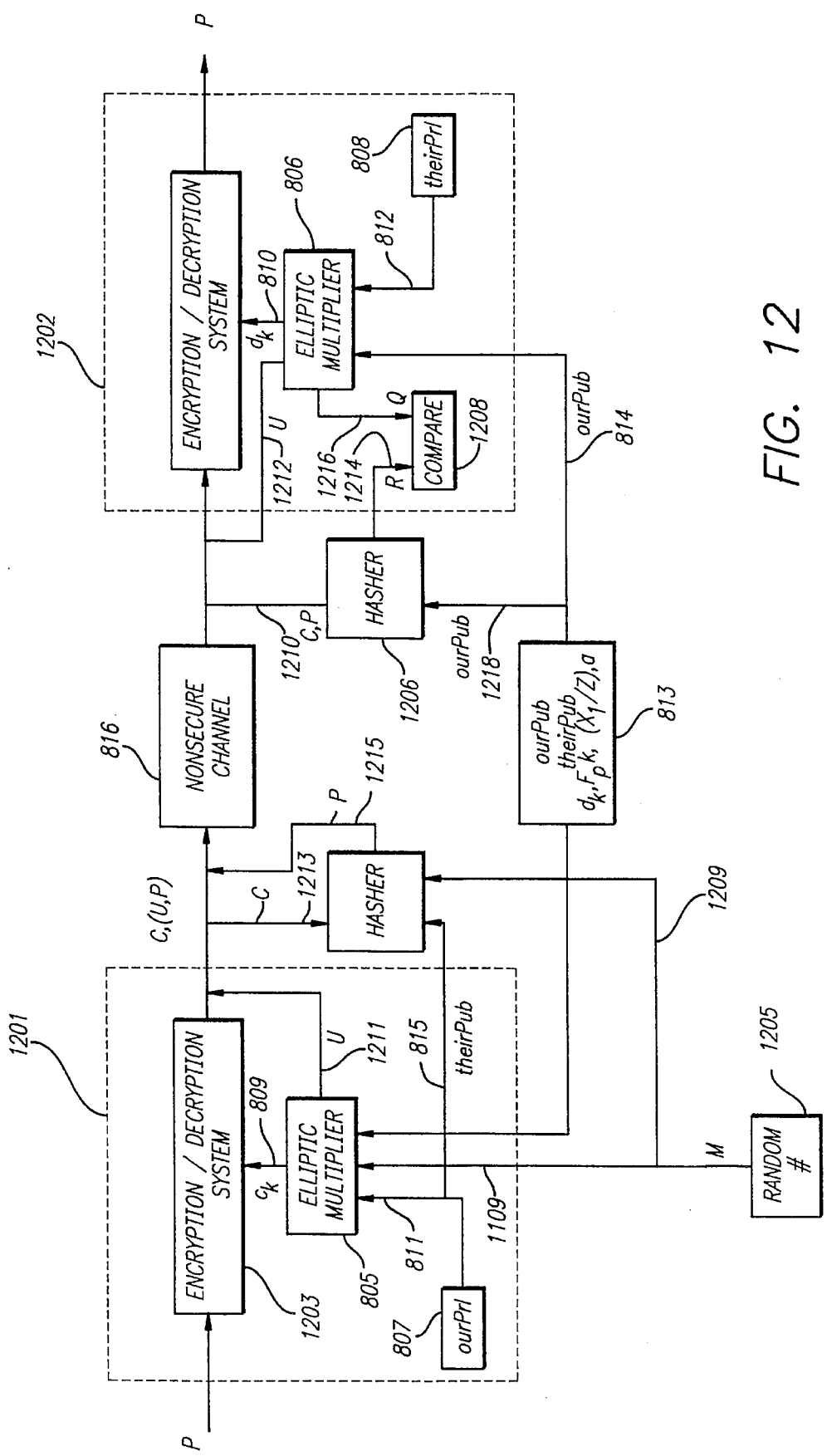
FIG. 12 illustrates a block diagram for implementing the digital signature scheme of the present invention.

FIG. 12 illustrates a block diagram for implementing the digital signature scheme of the present invention. Where elements of FIG. 12 are in common with elements of FIG. 8, the same element numbers are used. The signature scheme is shown in use with an encryption scheme that uses elliptic multiplication, but this is by way of example only. The present invention can be used with any type of encryptions scheme.

A sender, represented by the components within dashed line 1201, encrypts a plaintext message Ptxt to a ciphertext message C and generates a signature (u, P). This message C and signature (u, P) is sent to a receiver, represented by the components within dashed line 1202. The receiver 1202 decrypts the ciphertext message C to recover the plaintext message, and authenticates the signature (u, P).

The sender 1201 comprises an encryption/decryption means 1203, an elliptic multiplier 805, a random number generator 1205, a hasher 1207, and a private key source 807. The encryption/decryption means 1203 is coupled to the elliptic multiplier 805 through line 809. The elliptic multiplier 805 is coupled to the private key source 807 through line 811. The random number generator 1205 provides random number rn on line 1209 to elliptic multiplier 805 and to hasher 1207. Elliptic multiplier 805 provides point u to the nonsecure channel 816 via line 1211. The encrypted ciphertext C is provided to hasher 1207 via line 1213. Hasher 1207 provides point P to nonsecure channel 816 via line 1215.

The encryption/decryption means 1204 of receiver 1202 is coupled to elliptic multiplier 806 through line 810. The elliptic multiplier 806 is coupled to the private key source 808 through line 812. The point u is provided to the elliptic multiplier 806 from the nonsecure channel 816 via line 1212. Elliptic multiplier 806 generates point Q and provides it to comparator 1208 via line 1216. Hasher 1206 recieves the ciphertext message C and point P from nonsecure channel 816 via line 1210, and ourPub from source 813 via line 1218. Hasher 1206 outputs point R to comparator 1208 via line 1214.

The private key source 807 of the sender 801 contains the secure private password of the sender, "ourPri". Private key source 807 may be a storage register in a computer system, a password supplied by the sender to the cryptosystem when a message is sent, or even a coded, physical key that is read by the cryptosystem of FIG. 12 when a message is sent or received. Similarly, the private key source 808 of receiver 802 contains the secure private password of the receiver, namely, "theirPri".

A separate source 813 stores publicly known information, such as the public keys "ourPub"and "theirPub" of sender 1201 and receiver 1202, the initial point $(x_1, y_1)$, the field $F_{pk}$, and curve parameter "a". This source of information may be a published directory, an on-line source for use by computer systems, or it may transmitted between sender and receiver over a non-secure transmission medium. The public source 813 is shown symbolically connected to sender 1201 through line 815 and to receiver 1202 and hasher 1206 through lines 814 and 1218 respectively.

In operation, the sender and receiver generate a common one time pad for use as an enciphering and deciphering key in a secure transmission, as described above. The enciphering key is provided to the encryption/decryption means 1203, along with the plaintext message. The enciphering key is used with an encrypting scheme, such as the DES scheme or the elliptic curve scheme of the present invention, to generate a ciphertext message C. The random number generator 1205 generates random number m and provides it to elliptic multiplier 805. Elliptic multiplier 805 generates point u and provides it to the receiver via nonsecure channel 816. The ciphertext message C is provided to the hasher 1207, along with the random number m and ourPri. Hasher 1207 generates point P and provides it to nonsecure channel 816. The ciphertext message, along with signature (u, P), is transmitted to the receiver 1202 over a nonsecure channel 816.

The receiver 1202 generates a deciphering key $D_K$ using the receiver's private key, theirPri. TheirPri is provided from the private key source 808 to the elliptic multiplier 806, along with sender's public key, ourPub, (from the public source 813). Deciphering key $D_K$ is generated from (theirPri)°(ourPub) (mod p). The deciphering key $D_K$ is equal to the enciphering key $e_K$ due to the abelian nature of the elliptic multiplication function. Therefore, the receiver 1202 reverses the encryption scheme, using the deciphering key $D_K$, to recover the plaintext message from the ciphertext message C.

The elliptic multiplier 806 of the receiver 1202 receives point u from the nonsecure channel 816. The elliptic multiplier 806 generates point Q and provides it to comparator 1208. Hasher recieves the ciphertext message C and point P from the nonsecure channel 816 and the purported senders public key ourPub from source 813 and generates point R, which it provides to comparator 1208. Comparator 1208 compares points Q and R and if they match, the signature is assumed to be valid. In the present invention, the comparison of points Q and R is accomplished using the optimized scheme using x values described above.

The encryption/decryption means and elliptic multiplier of the sender 1201 and receiver 1202 can be implemented as program steps to be executed on a microprocessor.

Code

A function to compare signatures using the optimized scheme is as follows:

```
int
signature_compare(key p1, key p2, key p3);
/* Returns non-zero if x(p1) cannot be the x-coordinate of the
sum of two points whose respective x-coordinates are x(p2),
x(p3). */
```

A function to calculate Q and compare it with (P+M(ciphertext, P)°ourPub) is as follows:

```
q = new_public_from_private (NULL, depth, seed);
elliptic_mul (q, u); /* u is the random integer. */
elliptic_mul (our, m); /* m = M(cipertext, P). */
/* Next, use the transmitted point p. */
if(signature_compare (p, our, q))
    fprintf(stderr,"Signature invalid.\n");
```

Encryption/Decryption

The encryption/decryption schemes of the present invention can be implemented in the programming language C. The following are examples of programmatic interfaces (.h files) and test programs (.c files) suitable for implementing the encryption/decryption of the present invention.

```
/* fee.h

© 1991 NeXT Computer, Inc. All Rights Reserved.
 */ import "giants.h"

define DEFAULT_VERSION 1 #define DEFAULT_DEPTH 4 #define DEFAULT_SEED 0
#define MAX_DEPTH 22 #define FEE_TOKEN "scicompg" #define BUF_SIZE 8192
#define KEY_TOO_SHORT 1 #define ILLEGAL_CHARS_IN_KEY 2 #define BAD_TOKEN
3 #define VERSION_PARAM_MISMATCH 4 #define DEPTH_PARAM_MISMATCH 5
#define SEED_PARAM_MISMATCH 6 #define EXP_PARAM_MISMATCH 7 #define
A_PARAM_MISMATCH 8 #define X1_PARAM_MISMATCH 9 typedef giant padkey;

typedef struct {
         int version; int depth; int seed; int exp; int a; int x1;
         padkey x;
} keystruct; typedef keystruct *key;

int hexstr_illegal(char *pub_hex); /* Returns non-zero iff pub_hex is
not a valid hex string. */ void hexstr_to_key(char *str, key public); /* Jams public (assumed pre-
malloced) with hex str contents. */ char * new_hexstr_from_key(key public); /* Mallocs and returns a hex
string representing public. */
```

```
key new_public_from_private(char *private, int depth, int seed); /*
Mallocs and returns a new public key. If private==NULL, depth and seed
are ignored, and the returned key is simply malloc'ed but without
meaningful parameters. If private is a valid string, depth and seed are
used to establish correct elliptic parameters. depth is 0 to MAx_DEPTH
inclusive, while seed = DEFAULT_SEED usually, but may be chosen to be
any integer in order to change the encryption parameters for the given
depth. The depth alone determines the time to generate one-time pads.
   */ char * new_hexstr_from_pad(); /* Malloc's and returns a hex string,
null-terminated, representing the one-time pad. This function is usually
called after a make_one_time_pad() call.
   */ void generate_byte_pad(char *byte_pad, int len); /* Jams byte_pad with
len bytes of the one-time pad. There is no null termination; just len
bytes are modified.
   */ int make_one_time_pad(char *private, key public); /* Calculate the
internal one-time pad. */ void free_key(key pub); /* De-allocate an allocated key. */ void NXWritePublic(NXStream *out, key my_pub); /* Write a key to out
stream. */ void NXReadPublic(NXStream *in, key pub); /* Read a key from in stream.
*/ int keys_inconsistent(key pub1, key pub2); /* Return non-zero if pub1,
pub2 have inconsistent parameters.
   */ int encrypt_stream(NXStream *in, NXStream *out, key their_pub, key
my_pub, char *my_pri); /* Encrypt in to out. If my_pub!=NULL, a
consistency check for equivalent parameters with their_pub is performed,
with possible non-zero error returned (and encryption aborted).
Otherwise, when my_pub==NULL, an internal key is temporarily created for
insertion into the out stream.
   */ int decrypt_stream(NXStream *in, NXStream *out, char *my_pri); /*
Decrypt in to out. Non-zero error value is returned if an internal token
```

(that should have been present in the in stream) is not properly
decrypted.
*/

```
void set_crypt_params(int *depth, int *exp, int *a, int *x1, int *seed);

void str_to_giant(char *str, giant g);

int ishex(char *s);

void byte_to_hex(int b, char *s);

void hex_to_byte(char *s, int *b);

int hexstr_to_int(char **s);

int int_to_hexstr(int n, char *str);

int giant_to_hexstr(giant g, char *str);

void make_base(int exp);

void init_elliptic();

padkey get_pad();

void ell_even(giant x1, giant z1, giant x2, giant z2, int a, int q);

void ell_odd(giant x1, giant z1, giant x2, giant z2, giant xor, giant zor, int q);

int scompg(int n, giant g);

void elliptic(giant xx, giant zz, giant k, int a, int q);

unsigned char byt(padkey x, int k);

int version_param(key pub);

int depth_param(key pub);

int seed_param(key pub);

int exp_param(key pub);
```

```
    int a_param(key pub);

int x1_param(key pub);
```

```
/* keytest.c
    Test program for public key exchange, Usage: > keytest depth
    MyPrivate TheirPrivate © 1991 NeXT Computer, Inc. All Rights Reserved
*/ import <stdio.h> #import <streams/streams.h> #import "fee.h"

main(int argc, char **argv) {
        key my_pub, their_pub; char *my_pub_str, *their_pub_str; char
        *padstr; int depth;

if(argc<4) {
                fprintf(stderr, "Usage: keytest depth MyPrivate
                TheirPrivate\n"); exit(0);
        } depth = atoi(argv[1]); my_pub =
        new_public_from_private(argv[2], depth, DEFAULT_SEED);
        their_pub = new_public_from_private(argv[3], depth,
        DEFAULT_SEED);

my_pub_str = new_hexstr_from_key(my_pub); their_pub_str =
        new_hexstr_from_key(their_pub);

printf("My Public Key:\n%s\n",my_pub_str); printf("Their
        Public Key:\n%s\n",their_pub_str);

free(my_pub_str); free(their_pub_str);

make_one_time_pad(argv[2], their_pub); padstr =
        new_hexstr_from_pad(); printf("One-time pad, using My Private
        and Their Public:\n%s\n",padstr); free(padstr);

make_one_time_pad(argv[3], my_pub); padstr =
        new_hexstr_from_pad(); printf("One-time pad, using Their
        Private and My Public:\n%s\n",padstr); free(padstr);

free_key(my_pub); free_key(their_pub);

printf("The two one-time pads should be equivalent.\n");

}
```

```
/* solencrypt.c
    Solitaire encryption for personal files, Usage: > solencrypt <depth>
    file file.ell Private Key:

© 1991 NeXT Computer, Inc. All Rights Reserved
 */ import <stdio.h> #import <streams/streams.h> #import "fee.h"

main(int argc, char **argv) {
        key my_pub; int depth; char *my_pri; NXStream *inStream,
        *outStream;

if(argc<3) {
fprintf(stderr, "Usage: solencrypt <depth> file file.ell\nPrivate Key:
\nwhere depth is an integer 0 through 22, def ault = 4.\n");
        exit(0); } if(argc==4) depth = atoi(argv[1]); else depth =
        DEFAULT_DEPTH;

/* Next, open the streams. */ inStream = NXMapFile(argv[argc-2],NX_READONLY); outStream =
        NXOpenMemory(NULL,0,NX_WRITEONLY);

/* Next, get private key, make public key, encrypt stream, blank the
private key in memory. */ my_pri = (char *) getpass("Private Key: "); my_pub =
        new_public_from_private(my_pri, depth, DEFAULT_SEED);
        encrypt_stream(inStream, outStream, my_pub, my_pub, my_pri);
        bzero(my_pri, strlen(my_pri)); free_key(my_pub);

/* Next, flush and write. */

NXFlush(inStream); NXFlush(outStream); NXSaveToFile(outStream,
        argv[argc-1]); NXClose(inStream); NXCloseMemory(outStream,
        NX_FREEBUFFER);

}
```

```
/* soldecrypt.c
   Solitaire encryption for personal files, Usage: > soldecrypt file.ell
   file Private Key:

© 1991 NeXT Computer, Inc. All Rights Reserved
*/ import <stdio.h> #import <streams/streams.h> #import "fee.h"

main(int argc, char **argv) {
         char *my_pri; NXStream *inStream, *outStream; int err;

if(argc<3) {
                  fprintf(stderr, "Usage: soldecrypt file.ell
                  file\nPrivate Key: \n"); exit(0);
         }

/* Next, open the streams. */ inStream = NXMapFile(argv[1],NX_READONLY); outStream =
         NXOpenMemory(NULL,0,NX_WRITEONLY);

/* Next, decrypt the stream and blank the private key in memory. */ my_pri = (char *) getpass("Private Key: "); err =
         decrypt_stream(inStream, outStream, my_pri); bzero(my_pri,
         strlen(my_pri)); if(err) {
                  fprintf(stderr,"Error %d: bad private key.\n", err);
                  exit(0);
         }

/* Next, write and close. */

NXSaveToFile(outStream, argv[2]); NXClose(inStream);
         NXCloseMemory(outStream, NX_FREEBUFFER);
}
```

I claim:

1. A method for creating and authenticating a digital signature comprising the steps of:

in a sender computer system;
- generating a random integer m;
- using m, generating a point $P_1$ having coordinates $(X_1, Y_1)$;
- using m and $P_1$, generating a point u;
- sending the pair $(u, P_1)$ as a digital signature to a receiver computer system;

in said reciever computer system;
- using u, generating a point Q having coordinates $(X, Y)$;
- using $P_1$, generating a point $P_2$ having coordinates $(X_2, Y_2)$;
- without using $Y_1$ and $Y_2$, testing the equality $P_1+P_2=Q$;

identifying a signature as not authentic when the equality $P_1+P_2=Q$ is not satisfied.

* * * * *